United States Patent

[11] 3,579,753

| [72] | Inventor | Dale H. Pryor<br>Houston, Tex. |
| --- | --- | --- |
| [21] | Appl. No. | 17,778 |
| [22] | Filed | Mar. 9, 1970 |
| [45] | Patented | May 25, 1971 |
| [73] | Assignee | Youngstown Sheet and Tube Company<br>Youngstown, Ohio |

[54] PIPE-GRIPPING APPARATUS
7 Claims, 5 Drawing Figs.

| [52] | U.S. Cl. | 24/263 |
| --- | --- | --- |
| [51] | Int. Cl. | F16l 7/00 |
| [50] | Field of Search | 294/102 |
| | (A); 24/263 (D), 263 (DG), 263 (DJ), 263 (DN) | |

[56] References Cited
UNITED STATES PATENTS

| 2,575,356 | 11/1951 | Mullinix | 24/263.5SAA |
| --- | --- | --- | --- |
| 3,097,409 | 7/1963 | Kelley | 24/263.5SAA |

*Primary Examiner*—Donald A. Griffin
*Attorneys*—J. Vincent Martin, M. H. Gay, Alfred H. Evans and Jack R. Springgate

ABSTRACT: This invention relates to a new type of pipe-gripping apparatus wherein pipe-engaging slips are carried by linkage elements which are supported at one end by shoes engaging a slip bowl and at the other end by a floating ring, resulting in the frictional forces between the shoes and the bowl being less than those between the slips and the pipe so that the slips are able to retain the pipe by friction alone and without the aid of knurls, teeth, serrations, or the like on the slips.

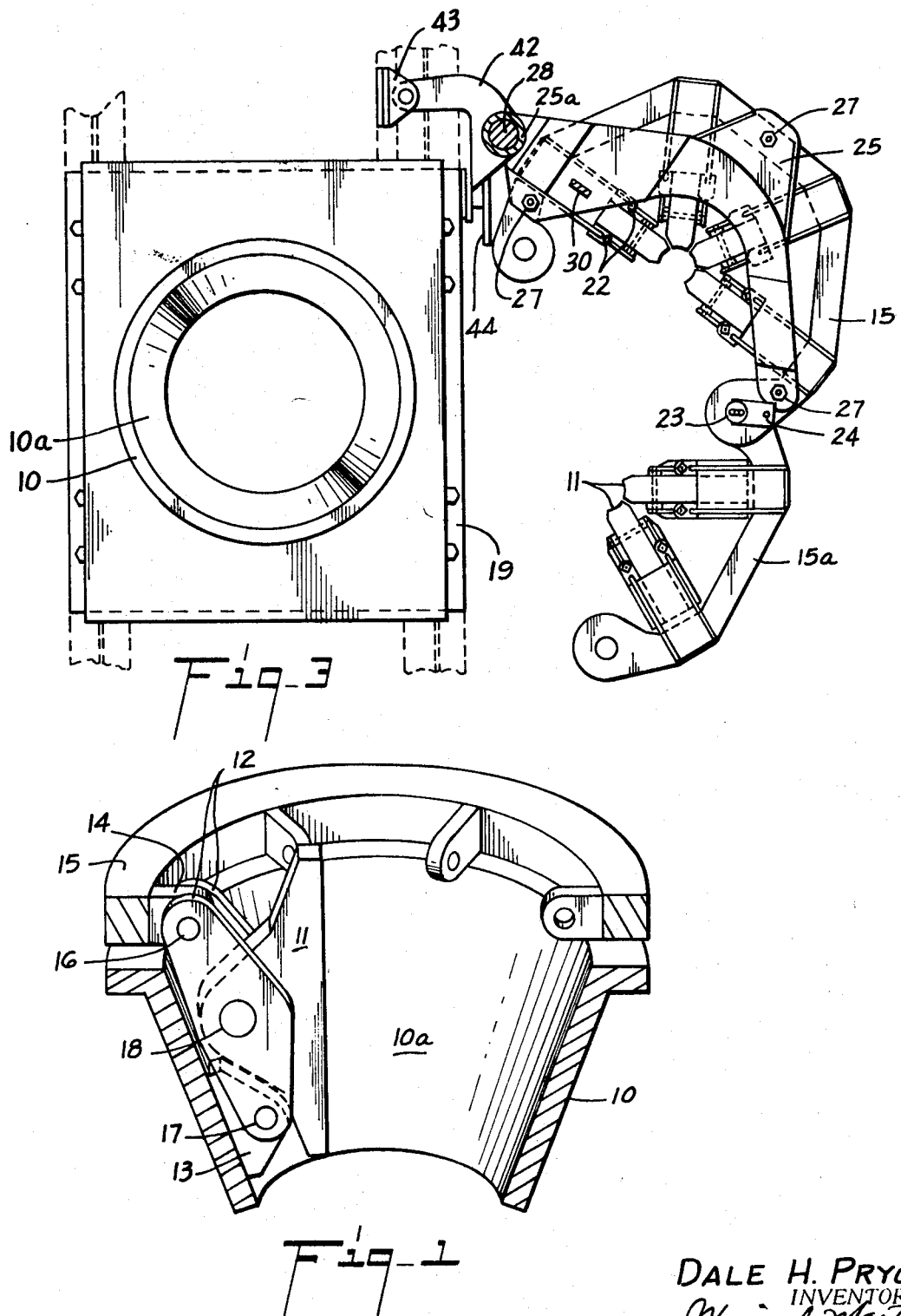

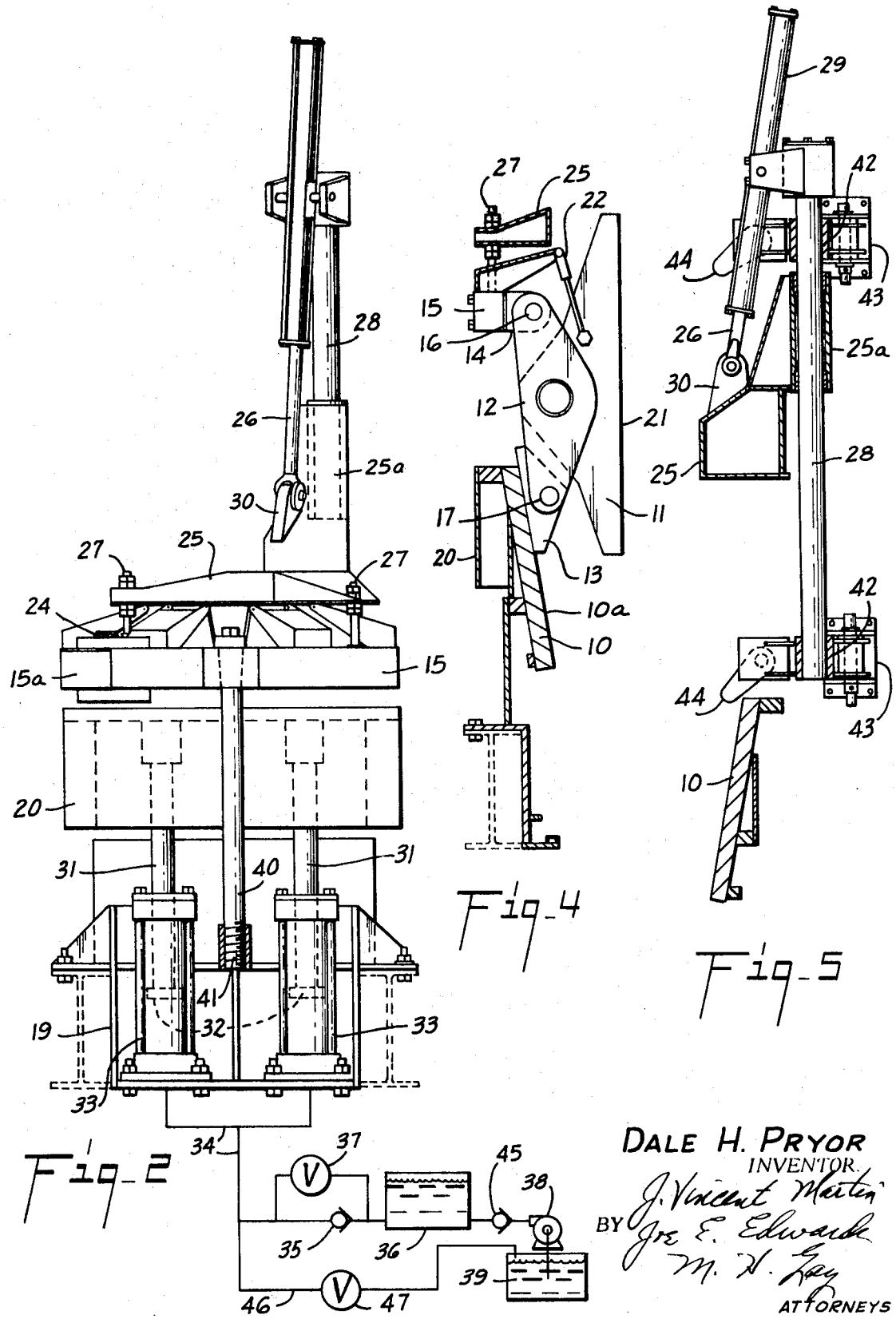

PIPE-GRIPPING APPARATUS

This invention relates to pipe-gripping apparatuses, and more particularly to an apparatus which will retain a vertically disposed elongate object, such as a pipe, by frictional forces alone, such forces being generated by the weight of the pipe being retained.

Numerous pipe-gripping devices, or "pipe slips" as they are sometimes called, are presently available in which the gripping force is provided by a tapered shoe riding in a tapered slip bowl. These devices as presently known employ knurls, teeth, serrations, etc. on the pipe-engaging faces of the gripping members to increase the holding power between the gripping members and the pipe. With certain types of pipe, such as armored flexible pipe, these serrations, etc. are undesirable since they may damage the wires armoring the pipe. Therefore, in these cases it is necessary to use smooth-faced gripping members which must hold the pipe by friction alone. With present pipe slip devices, this is impracticable because the friction between a smooth gripping members and a pipe will be approximately the same as that between the slip bowl and the shoe riding in the bowl. Therefore, there is nothing to force the shoe down into the bowl and the slip will not set. To overcome this problem, it is necessary to increase the normal force between the gripping member, or pipe slip, and the pipe over that between the slip bowl and the shoe.

It is, therefore, an object of this invention to provide a pipe-gripping apparatus in which the normal forces between the pipe slips and the pipe are greater than those between the slip bowl and the shoes engaging the bowl.

Another object is to provide a pipe-gripping apparatus for holding an elongate member, such as a pipe, by frictional force alone, such force being generated by the weight of the pipe being held.

A further object is to provide such a pipe-gripping apparatus in which the holding members may be removed from the slip bowl so that large items may be passed through the bowl.

Another object is to provide such an apparatus including means for positively gripping the pipe so that it will be retained against upward as well as downward resultant forces.

A still further object is to provide such an apparatus wherein the aforementioned means for positively gripping the pipe may also act as a shock absorber system for preventing damage to the pipe or the gripping apparatus, due to stopping the pipe while the pipe is moving through the apparatus at a high rate of speed.

These and other objects and advantages of the invention will become apparent from the drawings, specification and claims.

In the accompanying drawings which illustrate the preferred embodiment of the present invention, and wherein like numerals indicate like parts:

FIG. 1 is a schematic illustration, partially in section, of a pipe-gripping apparatus in accordance with the present invention, with one shoe and its linkage shown;

FIG. 2 is an elevation of the preferred form of the pipe-gripping apparatus of the present invention;

FIG. 3 is a plan view, partially in section, of the apparatus of FIG. 2;

FIG. 4 is a fragmentary view of the apparatus of FIG. 2, showing one pipe slip and its associated equipment;

FIG. 5 is a fragmentary view of the apparatus of FIG. 2, showing the overhead lifting and pivoting mechanism.

The invention may best be understood by reference to FIG. 1. There is shown a slip bowl 10 with a tapered inside surface 10a. The slip bowl may be mounted over a well bore, or elsewhere where it is desired to suspend a string of pipe. A floating annular ring 15, free to move vertically and laterally, is disposed above the slip bowl 10. A plurality of symmetrically disposed linkage elements, two of which are shown at 12, are pivotally attached at one end to the ring 15 by means of pins 16 engaging lugs 14 on the ring. The other end of each linkage element 12 is pivotally supported with pin 17 by a shoe 13 which slidably engages the slip bowl surface 10a. Each pair of linkage elements pivotally carries with pin 18 a pipe slip 11 which is adapted to engage a pipe being gripped by the apparatus.

With this arrangement it is apparent that any force exerted normal to the face of slip 11 will be divided by linkage elements 12 between shoe 13 and the ring 15. Due to the symmetrical arrangement the lateral forces on ring 15 will cancel each other, leaving no net lateral force to displace the ring. Since the ring is free to move vertically, it generates no frictional forces.

The forces exerted by the shoes 13 on the slip bowl 10 will generate friction forces. The magnitude of these frictional forces depends on the frictional coefficients of the materials and the amount of normal force. The normal force between a slip 11 and a pipe in engagement with the slip will be greater than the force between the shoe 13 and the slip bowl 10 by the following ratio:

$$\left[\frac{\text{distance between pivot pin 16 and pivot pin 17}}{\text{distance between pivot pin 16 and pivot pin 18}}\right]$$

Assuming similar materials the frictional forces will be greater by approximately the same ratio.

Since the annular ring 15 is capable of frictionless vertical movement, the only friction forces present are those between the shoe 13 and the bowl 10, and between the slip 11 and a pipe in engagement with the slip—the latter always being the greater of the two. Thus, when the slips 11 are brought into contact with a downwardly moving pipe, the greater friction between the pipe and the slips 11 will overcome the lesser friction between the shoes 13 and slip bowl 10, and the shoe will move downwardly on the bowl surface, pivoting linkages 12 about pins 16 and 17. This will move slips 11 closer to the centerline of the well, increasing the normal force and consequently the holding force between the slips and the pipe.

The preferred form of the pipe-gripping apparatus of the present invention is shown in FIGS. 2 through 5. There is shown a base 19 with slip bowl 10 carried on the base within housing 20. The slip bowl has a center opening through which pipe may pass to the well bore below. The arrangement of the ring 15, slips 11 and shoes 13 is substantially as described in connection with FIG. 1. Floating ring 15 is disposed above the bowl 10. Linkage elements 12 are pivotally attached in symmetrical arrangement to the ring and depend therefrom. A bowl-engaging shoe 13 is pivotally attached near the dependent end of each linkage element 12, one shoe preferably supporting a pair of linkage elements. The shoe 13 slidably engages the surface 10a of bowl 10. A pipe-engaging slip 11 is pivotally attached to each linkage element 12 intermediate the point where the linkage element is attached to the ring 15 and the point where the shoe 13 is attached to the linkage element. The pipe-engaging face of slip 11 is preferably arcuate for maximum surface contact with the pipe. A pair of yokes 22 carried by ring 15 hold each slip 11 approximately parallel to the pipe.

As shown in FIG. 3, the ring 15 has a gate portion 15a which may be opened by removal of either of two hinge pins 23 which connect the two parts of ring 15. Only one hinge pin 23 is shown, the other having been removed so that the gate 15a could be opened. Keepers 24 prevent accidental disengagement of a hinge pin 23. The gate 15a permits the pipe-gripping assembly to be placed about or removed from a pipe which may be upstanding in the slip bowl 10.

Powered means are preferably provided for moving the pipe-engaging slips 11 between a lowered operative position and a raised inoperative position. In the preferred embodiment, these means are provided, as shown most clearly in FIGS. 2 and 5, by an overhead support arm 25 and a hydraulically operated lifting arm 26. The overhead support arm 25 is connected to ring 15 by three tie bolts 27 and has a portion 25a which slidably engages a guide shaft 28. Guide shaft 28 is supported by upper and lower hinges 42 pivotally mounted on hinge plates 43 attached to a suitable vertical support (not shown). Latches 44 carried on hinges 42 are provided for locking guide shaft 28 in operative position (FIG. 5). Guide shaft 28 mounts near its upper end hydraulic cylinder 29. Lifting arm 26 is connected at its upper end to the piston (not shown) of hydraulic cylinder 29 and pivotally connected at its lower end to ear 30 of support arm 25.

Thus, to engage the pipe slips 11, cylinder 29 is actuated to extend lifting arm 26, causing overhead support arm 25 to ride down guide shaft 28. This moves ring 15, linkage elements 12, slips 11 and shoes 13 downward. As shoes 13 move down the bowl, linkage elements 12 pivot about their supporting pins 16 and 17, moving slips 11 toward the centerline of the well until the pipe is engaged. At this point, the friction between a downwardly moving pipe and the slips 11 will cause the gripping apparatus to set and stop the pipe. The pipe is disengaged by lifting the pipe slightly with some external means and retracting lifting arm 26 within hydraulic cylinder 29 which will lift the slips 11, thereby releasing the pipe.

If the slips are set while pipe is traveling through the bowl 10 at a high rate of speed, the shock effect could damage the pipe or the pipe-gripping apparatus. Therefore, shock absorber means are preferably provided to safely absorb the momentum of the moving pipe. The preferred hydraulic shock-absorbing system is illustrated in FIG. 2 with the hydraulic system indicated schematically. The bowl 10 and its housing 20 are supported by piston arms 31 having at their lower ends pistons 32 within hydraulic cylinders 33 mounted on the base 19. A strong downward force on the bowl 10 will force the pistons 32 downwardly in cylinders 33. As the pistons move downward, they force fluid out through lines 34, past check valve 35, and into accumulator 36. The pressure in the accumulator and cylinders will increase until it overcomes the weight of the pipe, at which time movement of the pipe will be stopped. Since the inertial forces have been overcome once the pipe is stopped, the tendency of the system would be to force the pistons upward and raise the bowl 10. This is prevented by check valve 35 which prevents fluid from flowing back from the accumulator into the cylinders. To restore the bowl to its original position, bypass valve 37 must be opened. Once the bowl is back in its original position, the bypass valve 37 is again closed. Check valve 45 prevents fluid from leaking through pump 38 into reservoir 39.

This shock absorber system has the advantage of eliminating the "bounce" found in most shock absorbers. Also, the amount of shock absorption can be changed by varying the gas charge to the accumulator. This permits the system to adequately handle various sizes and lengths of pipe string.

Under certain circumstances, it may be necessary to retain the pipe against upward resultant forces. One such circumstance is when flexible drill collars are being used. These collars require an upward pull on the pipe string to force them into a straightened and fixed position before they are locked in rigid relationship. Therefore, means are preferably provided in the pipe-gripping apparatus for providing a positive gripping action between the slips 11 and the pipe which is not dependent upon the weight of the pipe.

The preferred means for providing this positive gripping action consists in using the hydraulic shock absorber system (with extra fluid pressure supplied by a pump 38 from reservoir 39) to elevate the slip bowl 10 while limit bolts 40 threaded into sockets 41 in the base 19 prevent upward movement of ring 15. This forces the slips 11 into tighter contact with the pipe and will hold the pipe against upward movement.

In certain cases it may be necessary to completely remove the pipe-gripping assembly from the slip bowl so that large items such as drill bits, casing and the like can be passed through the bowl and into the well. This may be accomplished in the present apparatus by retracting lifting arm 26 so as to raise the ring 15 and its associated equipment, while lowering the bowl 10 with the shock absorber system by bleeding fluid from the cylinders 33 through line 46 and valve 47 to reservoir 39. This permits the slips 11 and shoes 13 to completely clear the top of bowl 10. If a pipe is standing in the bowl, hinge pin 23 may be removed so as to open gate 15a in the ring 15. The ring and its associated equipment are then pivoted about guide shaft 28 to an out-of-way position. Guide shaft 28 is mounted on upper and lower hinges 42 pivotally carried by upper and lower hinge plates 43 on suitable vertical support means (not shown). Therefore guide shaft 28 and all equipment carried by it may be further pivoted on hinges 42 to a fully out-of-way position, as indicated in FIG. 3. The equipment may be placed in this fully out-of-way position when the pipe-gripping apparatus will be inactive for some period of time.

The foregoing disclosure and description of the invention is illustrative and explanatory thereof, and various changes in the size, shape and materials as well as in the details of the illustrated construction, may be made within the scope of the appended claims without departing from the spirit of the invention.

I claim:

1. A pipe-gripping apparatus comprising,
   a slip bowl,
   a floating annular ring,
   a plurality of symmetrically arranged linkage elements each pivotally attached at one end to said ring,
   the other end of each said linkage element having a shoe pivotally attached thereto and adapted to slidably engage said bowl, and
   a pipe-engaging slip pivotally attached to each linkage element intermediate the point of attachment of said element to said ring and the point of attachment of said shoe to said element.

2. A pipe-gripping apparatus according to claim 1 wherein powered means are provided for moving said pipe-engaging slips between a lowered operative position and a raised inoperative position.

3. A pipe-gripping apparatus according to claim 1 wherein said slips are relatively smooth faced and are adapted to retain a pipe by frictional forces only.

4. A pipe-gripping apparatus according to claim 1 wherein means are provided for elevating said bowl while retaining said shoes and slips against upward movement to thereby provide a positive gripping action which will retain a pipe being gripped by the apparatus against upward as well as downward resultant forces.

5. A pipe-gripping apparatus comprising,
   a base,
   a slip bowl carried by said base,
   a floating annular ring disposed above said bowl,
   a plurality of symmetrically arranged linkage elements pivotally attached to said ring and depending therefrom,
   a bowl-engaging shoe pivotally attached to each linkage element near its dependent end and adapted to slidably engage said slip bowl,
   a pipe-engaging slip pivotally attached to each linkage element intermediate the point of attachment of said element to said ring and the point of attachment of said shoe to said element.

6. A pipe-gripping apparatus comprising:
   a base;
   a slip bowl carried on said base;
   a floating annular ring disposed above said bowl;
   a plurality of symmetrically arranged linkage elements pivotally attached to said ring and depending therefrom;
   a bowl-engaging shoe pivotally attached near the dependent end of each linkage element and adapted to slidably engage said bowl;
   a pipe-engaging slip pivotally attached to each linkage element intermediate the point of attachment of said element to said ring and the point of attachment of said shoe to said element;
   means for elevating said bowl relative to said base while retaining said ring against upward movement to thereby provide a positive gripping action so that a pipe being gripped by the apparatus will be held against upward as well as downward resultant forces.

7. A pipe-gripping apparatus according to claim 6 wherein said means for elevating the slip bowl also provides a shock absorbing mounting for said bowl.